(12) United States Patent
Kitamura et al.

(10) Patent No.: US 11,764,406 B2
(45) Date of Patent: Sep. 19, 2023

(54) ALL-SOLID BATTERY AND METHOD OF MANUFACTURING THE SAME

(71) Applicant: Panasonic Intellectual Property Management Co., Ltd., Osaka (JP)

(72) Inventors: Yoshiro Kitamura, Osaka (JP); Katsuji Sumimoto, Nara (JP); Akihiro Horikawa, Osaka (JP)

(73) Assignee: Panasonic Intellectual Property Management Co. Ltd., Osaka (JP)

( * ) Notice: Subject to any disclaimer, the term of this patent is extended or adjusted under 35 U.S.C. 154(b) by 505 days.

(21) Appl. No.: 16/706,629

(22) Filed: Dec. 6, 2019

(65) Prior Publication Data

US 2020/0212498 A1 Jul. 2, 2020

(30) Foreign Application Priority Data

Dec. 27, 2018 (JP) ................................ 2018-246160

(51) Int. Cl.
*H01M 10/0585* (2010.01)
*H01M 10/0525* (2010.01)
*H01M 10/0562* (2010.01)

(52) U.S. Cl.
CPC ... *H01M 10/0585* (2013.01); *H01M 10/0525* (2013.01); *H01M 10/0562* (2013.01)

(58) Field of Classification Search
CPC ....... H01M 2300/0065–0097; H01M 10/0562; H01M 10/0565
See application file for complete search history.

(56) References Cited

U.S. PATENT DOCUMENTS

| 9,005,817 | B2 | 4/2015 | Ichikawa |
| 2011/0045355 | A1 | 2/2011 | Ichikawa |
| 2013/0224632 | A1* | 8/2013 | Roumi ................. H01M 12/08 29/623.1 |
| 2017/0309964 | A1 | 10/2017 | Iwamoto |
| 2018/0226652 | A1 | 8/2018 | Mori et al. |
| 2019/0198860 | A1 | 6/2019 | Nishio et al. |
| 2019/0267666 | A1* | 8/2019 | Shin ................. H01M 10/0562 |
| 2021/0280869 | A1* | 9/2021 | Nakano ............ H01M 10/0562 |

FOREIGN PATENT DOCUMENTS

| JP | 2011-065982 | 3/2011 |
| JP | 2017-199668 | 11/2017 |
| JP | 2018-037309 | 3/2018 |
| JP | 2018-129222 | 8/2018 |
| JP | 2020087710 A * | 6/2020 |

OTHER PUBLICATIONS

Translation of JP2020-087710A (Year: 2020).*

* cited by examiner

*Primary Examiner* — Ryan S Cannon
(74) *Attorney, Agent, or Firm* — Wenderoth, Lind & Ponack, L.L.P.

(57) ABSTRACT

An all-solid battery is formed by laminating a first current collector, a positive-electrode layer, a solid electrolyte layer, a negative-electrode layer, and a second current collector in this order. The positive-electrode fine particle layer contains positive-electrode active material fine particles having a particle diameter smaller than that of the positive-electrode active material and is formed on a side surface of the positive-electrode layer. The negative-electrode fine particle layer contains negative-electrode active material fine particles having a particle diameter smaller than that of the negative-electrode active material and is formed on a side surface of the negative-electrode layer.

5 Claims, 9 Drawing Sheets

ALL-SOLID BATTERY AND METHOD OF MANUFACTURING THE SAME

BACKGROUND

1. Technical Field

The present disclosure relates to an all-solid battery and a method of manufacturing the same, and more particularly to an all-solid battery using a positive-electrode layer, a negative-electrode layer, and a solid electrolyte layer and a method of manufacturing the same.

2. Description of the Related Art

In recent years, development of a secondary battery that can be used repeatedly has been required due to light weighted and cordless electronic devices such as personal computers and mobile phones. Examples of secondary batteries include nickel cadmium batteries, nickel hydrogen batteries, lead storage batteries, and lithium ion batteries. Among these batteries, lithium ion batteries are attracting attention because of the features such as light weight, high voltage, and high energy density. Also in an automotive field such as electric vehicles and hybrid vehicles, development of high-capacity secondary batteries is regarded as important, and the demand for lithium ion batteries is increasing.

A lithium ion battery is configured with a positive-electrode layer, a negative-electrode layer, and an electrolyte disposed therebetween. For example, an electrolytic solution in which a supporting salt such as lithium hexafluorophosphate is dissolved in an organic solvent, or a solid electrolyte is used as the electrolyte. At present, lithium ion batteries widely used are flammable because an electrolyte containing an organic solvent is used. Therefore, materials, structures, and systems are needed to ensure the safety of lithium ion batteries. On the other hand, by using a non-combustible solid electrolyte as the electrolyte, it is expected that the above-described materials, structure, and system can be simplified, and it is considered that the increase of energy density, the reduction of manufacturing cost, and the improvement of productivity can be achieved. Hereinafter, a battery using a solid electrolyte is referred to as an "all-solid battery".

Solid electrolytes can be roughly divided into organic solid electrolytes and inorganic solid electrolytes. The organic solid electrolyte has an ion conductivity of about $10^{-6}$ S/cm at 25° C. and has a very low ion conductivity as compared to that of the electrolyte solution of about $10^{-3}$ S/cm. Therefore, it is difficult to operate an all-solid battery using an organic solid electrolyte in an environment of 25° C. As the inorganic solid electrolyte, there are an oxide-based solid electrolyte and a sulfide-based solid electrolyte. Their ion conductivity is about $10^{-4}$ S/cm or more and $10^{-3}$ S/cm or less, and the ion conductivity is relatively high. Oxide-based solid electrolytes have high grain-boundary resistance. Therefore, sintering and thinning of powder have been studied as a means of reducing grain-boundary resistance. However, in the case of sintering, it is difficult to obtain sufficient battery characteristics because the constituent elements of the positive-electrode or the negative-electrode and the constituent elements of the solid electrolyte mutually diffuse due to the treatment at a high temperature. Therefore, in the all-solid battery using an oxide-based solid electrolyte, studies of thin film are the mainstream. On the other hand, sulfide-based solid electrolytes have small grain boundary resistance compared with oxide-based solid electrolytes, and therefore good characteristics can be obtained only by powder compacting, and research has been actively promoted in recent years.

A coating type all-solid battery is configured from a positive-electrode layer, a negative-electrode layer, and a solid electrolyte layer. The positive-electrode layer contains a positive-electrode active material, a solid electrolyte, and a binder and is formed on a current collector made of metal foil. The negative-electrode layer contains a negative-electrode active material, a solid electrolyte, and a binder and is formed on a current collector made of metal foil. The solid electrolyte layer contains a solid electrolyte and a binder and is disposed between the positive-electrode layer and the negative-electrode layer. The coating type all-solid battery is manufactured by forming each of the materials of the positive-electrode layer, the negative-electrode layer, and the solid electrolyte layer into slurry using an organic solvent and forming a film on the metal foil. In the manufacturing of the all-solid battery, it is also desired to suppress a short circuit between each of the positive-electrode layer, the negative-electrode layer, and the current collector from the viewpoint of enhancing the reliability of the battery.

Moreover, in secondary batteries such as an all-solid battery, a lightweight and high capacity battery is desired, and volume energy density [Wh/L] is used as an evaluation index. The volume energy density is influenced by the shape and size of the all-solid battery.

In Japanese Patent Unexamined Publication No. 2018-37309, as shown in FIG. 9, an electrode structure for a secondary battery having a shape in which end portion 603 of core body 601 is positioned inside end portions 604a and 604b of first and second active material layers 602a and 602b, and a secondary battery using the plate, and a method of manufacturing the plate are disclosed.

In a secondary battery electrode shown in Japanese Patent Unexamined Publication No. 2018-37309, since a core is exposed at the end portion thereof, the ratio occupied by an active material layer is reduced, and the volume energy density is reduced. Furthermore, in an electrode for the secondary battery shown in Japanese Patent Unexamined Publication No. 2018-37309, since the end portion of the core and the end portion of the active material layer are close to each other, a short circuit is likely to occur in a case where foreign matter or the like is present.

In an all-solid battery, a region (hereinafter, referred to as a non-functional region) which does not function as a battery is present from about 2 mm to about 3 mm from a side surface of a positive-electrode layer or negative-electrode layer to a side surface of a current collector. This is for the purpose of preventing a short circuit between each of the positive-electrode layer, the negative-electrode layer, and the current collector. Moreover, it is for securing dimensional accuracy at the time of slurry application in manufacturing a coating type all-solid battery among all-solid batteries. Such a non-functional region is a factor that reduces the volume energy density and is desirably as small as possible, ideally does not exist.

SUMMARY

An all-solid battery of the present disclosure includes
a first current collector,
a positive-electrode layer that contains a positive-electrode active material,
a solid electrolyte layer that contains a solid electrolyte,
a negative-electrode layer that contains a negative-electrode active material, a second current collector,
a positive-electrode fine particle layer, and
a negative-electrode fine particle layer,
in which the first current collector, the positive-electrode layer, the solid electrolyte layer, the negative-electrode layer, and the second current collector are laminated in this order,
the positive-electrode fine particle layer contains positive-electrode active material fine particles having a particle diameter smaller than a particle diameter of particles of the positive-electrode active material and is formed on a side surface of the positive-electrode layer, and
the negative-electrode fine particle layer contains negative-electrode active material fine particles having a particle diameter smaller than a particle diameter of particles of the negative-electrode active material and is formed on a side surface of the negative-electrode layer.

A manufacturing method of an all-solid battery of the present disclosure includes:
a laminated structure forming step of forming a laminated structure by laminating a first current collector, a positive-electrode layer, a solid electrolyte layer, a negative-electrode layer, and a second current collector in this order, and
a laser cutting step of cutting the laminated structure with a laser beam, solidifying vapor from the laminated structure generated at the time of cutting, and depositing a solidified material on a side surface of the positive-electrode layer and a side surface of the negative-electrode layer.

DETAILED DESCRIPTION

Figure 1:
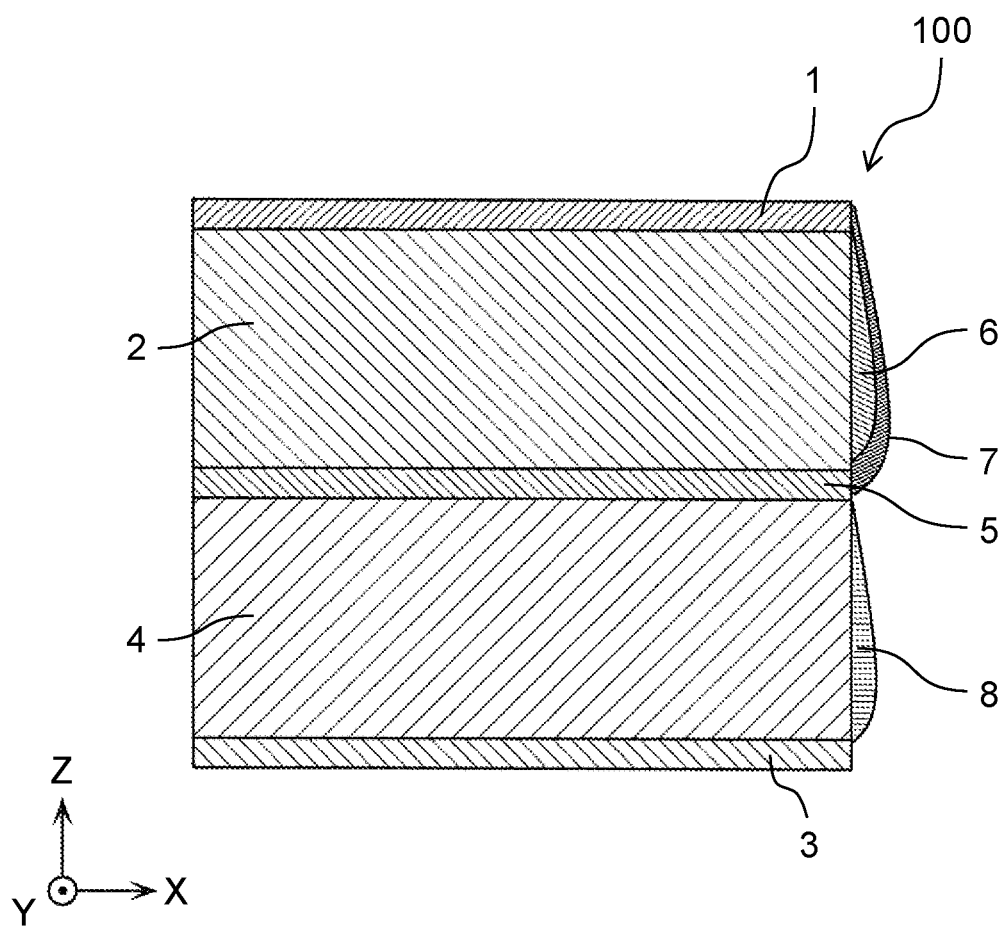
FIG. 1 is a schematic view of a cross section of an all-solid battery in EXEMPLARY EMBODIMENT 1 of the present disclosure.

In view of the problems discussed above, the present disclosure provides an all-solid battery with high volume energy density and a method of manufacturing the same. In particular, the present disclosure provides an all-solid battery with high volume energy density and a method of manufacturing the same by reducing the non-functional region.

In an all-solid battery in one embodiment of the present disclosure, a first current collector, a positive-electrode layer containing a positive-electrode active material, a solid electrolyte layer containing a solid electrolyte, a negative-electrode layer containing a negative-electrode active material, and a second current collector are laminated in this order. In the all-solid battery, a positive-electrode fine particle layer is formed in a state of being in contact with the side surface of the positive-electrode layer and contains positive-electrode active material fine particles having a particle diameter smaller than that of the positive-electrode active material. Furthermore, a negative-electrode fine particle layer is formed, which is in a state of being in contact with the side surface of the negative-electrode layer and contains negative-electrode active material fine particles having a particle diameter smaller than that of the negative-electrode active material.

Thus, fine particles of the positive-electrode active material are contained in the positive-electrode fine particle layer formed in contact with the side surface of the positive-electrode layer. Further, fine particles of the negative-electrode active material are contained in the negative-electrode fine particle layer formed in contact with the side surface of the negative-electrode layer. In a case where the side surface portions of the positive-electrode layer and the negative-electrode layer are cut with a laser to reduce the non-functional region, when cut surfaces are formed on the positive-electrode layer and the negative-electrode layer, an electron conduction path is interrupted at the cut side surfaces. However, by forming the positive-electrode fine particle layer and the negative-electrode fine particle layer containing the fine particles capable of electron conduction in the positive-electrode layer and the negative-electrode layer, an electron conduction path is newly formed. Therefore, the electron conduction efficiency is improved in the positive-electrode layer and the negative-electrode layer while reducing the non-functional region. In this manner, an all-solid battery with high volume energy density is provided, in which the battery capacity of the all-solid battery is improved.

In addition, for example, in the all-solid battery, a solid electrolyte fine particle layer containing solid electrolyte fine particles having a particle diameter smaller than that of the solid electrolyte may be formed on the outside of at least one of the positive-electrode fine particle layer and the negative-electrode fine particle layer in plan view.

Thereby, the solid electrolyte fine particle layer is formed on the outside of at least one of the positive-electrode fine particle layer and the negative-electrode fine particle layer. Therefore, even in a case where the non-functional region is reduced by cutting the side surface portions of the positive-electrode layer and the negative-electrode layer with a laser, the solid electrolyte fine particle layer is present outside at least one of the positive-electrode fine particle layer and the negative-electrode fine particle layer. Therefore, a short circuit due to at least one of the contact of the positive-electrode fine particle layer with the negative-electrode layer or the negative-electrode current collector and the contact of the negative-electrode fine particle layer with the positive-electrode layer or the positive-electrode current collector is suppressed. Therefore, the short circuit is suppressed and the non-functional region is reduced, thereby providing an all-solid battery with high volume energy density.

Also, for example, in the all-solid battery, the solid electrolyte fine particle layer may be formed so as to cover the outside the positive-electrode fine particle layer in plan view.

As a result, since the positive-electrode fine particle layer is covered with the solid electrolyte fine particle layer on the outside, the positive-electrode fine particle layer is not easily in contact with the negative-electrode layer or the negative-electrode current collector, and the short circuit is further suppressed.

Also, for example, in the all-solid battery, the solid electrolyte fine particle layer may be formed so as to cover the outside of the positive-electrode fine particle layer and the negative-electrode fine particle layer in plan view.

Thereby, since the positive-electrode fine particle layer and the negative-electrode fine particle layer are covered with the solid electrolyte fine particle layer on the outside, a short circuit due to the contact between the positive-electrode fine particle layer and the negative-electrode layer or the negative-electrode current collector and the contact between the negative-electrode fine particle layer and the positive-electrode layer or the positive-electrode current collector is further suppressed.

In addition, for example, in the all-solid battery, the length of the plane where the positive-electrode fine particle layer and the positive-electrode layer are in contact with each other in the laminating direction may be at least twice the particle diameter of the positive-electrode active material. Furthermore, the length of the plane where the negative-electrode fine particle layer and the negative-electrode layer are in contact with each other in the laminating direction may be at least twice the particle diameter of the negative-electrode active material.

As a result, the length of the plane where the positive-electrode fine particle layer and the positive-electrode layer are in contact with each other in the laminating direction and the length of the plane where the negative-electrode fine particle layer and the negative-electrode layer are in contact with each other in the laminating direction are secured. Therefore, the positive-electrode fine particle layer easily forms an electron conduction path between the positive-electrode active materials on the side surface of the positive-electrode layer, and the negative-electrode fine particle layer easily forms an electronic conductive path between the negative-electrode active materials on the side surface of the negative-electrode layer. Therefore, the battery capacity of the all-solid battery is further improved.

Moreover, a manufacturing method of the all-solid battery in one aspect of the present disclosure includes a laminated structure forming step and a laser cutting step. In the laminated structure forming step, a laminated structure formed by laminating a first current collector, a positive-electrode layer, a solid electrolyte layer, a negative-electrode layer, and a second current collector in this order is formed. In the laser cutting step, the laminated structure is cut by a laser beam, the vapor (material vapor) from the laminated structure generated at the time of cutting is solidified, and the solidified material is deposited on the side surface of the positive-electrode layer and the side surface of the negative-electrode layer.

Thereby, the non-functional region of the all-solid battery can be reduced by laser processing. Furthermore, by solidifying the material vapor generated at the time of cutting and depositing the solidified material on the side surface of the positive-electrode layer and the side surface of the negative-electrode layer, a positive-electrode fine particle layer and a negative-electrode fine particle layer containing fine particles of the material contained in each layer can be formed. Therefore, the electron conduction path is interrupted at the side surface where the positive-electrode layer and the negative-electrode layer are cut, but an electron conduction path is newly formed by forming the positive-electrode fine particle layer and the negative-electrode fine particle layer containing the fine particles capable of electron conduction. Therefore, it is possible to improve the battery capacity of the all-solid battery by improving the electron conduction efficiency in the positive-electrode layer and the negative-electrode layer while reducing the non-functional region and to manufacture an all-solid battery with high volume energy density.

Also, for example, in the method of manufacturing the all-solid battery, in the laser cutting step, the laminated structure may be cut by irradiating the laminated structure with the laser beam from above or below.

Thereby, the positive-electrode layer or the negative-electrode layer can be cut, and the solid electrolyte layer can be processed after forming the positive-electrode fine particle layer or the negative-electrode fine particle layer. Therefore, when cutting the solid electrolyte layer, the material vapor of the solid electrolyte can be solidified to form a solid electrolyte fine particle layer containing fine particles of the solid electrolyte on the outside of the positive-electrode fine particle layer or the negative-electrode fine particle layer. Therefore, since the solid electrolyte fine particle layer is present on the outside of the positive-electrode fine particle layer or the negative-electrode fine particle layer, a short circuit due to the contact between the positive-electrode fine particle layer and the negative-electrode layer or the negative-electrode current collector, or the contact between the negative-electrode fine particle layer and the positive-electrode layer or the positive-electrode current collector is suppressed. Therefore, the short circuit is suppressed and the non-functional region is reduced, thereby manufacturing an all-solid battery with high volume energy density.

Also, for example, in the method of manufacturing the all-solid battery, in the laser cutting step, the laminated structure may be cut by irradiating the laminated structure with the laser beam from above and below.

Thereby, the positive-electrode layer and the negative-electrode layer can be cut, and the solid electrolyte layer can be processed after forming the positive-electrode fine particle layer and the negative-electrode fine particle layer. Therefore, when cutting the solid electrolyte layer, the material vapor of the solid electrolyte can be solidified to form a solid electrolyte fine particle layer containing fine particles of the solid electrolyte on the outside of the positive-electrode fine particle layer and the negative-electrode fine particle layer. Therefore, since the solid electrolyte fine particle layer is present on the outside of the positive-electrode fine particle layer and the negative-electrode fine particle layer, a short circuit due to the contact between the positive-electrode fine particle layer and the negative-electrode layer or the negative-electrode current collector, and the contact between the negative-electrode fine particle layer and the positive-electrode layer or the positive-electrode current collector is suppressed. Therefore, the short circuit is further suppressed and the non-functional region is reduced, thereby manufacturing an all-solid battery with high volume energy density.

Also, for example, in the method of manufacturing the all-solid battery, in the laser cutting step, the material vapor may be solidified by blowing a gas to deposit the solidified material.

Thus, it is possible to adjust the position at which the material vapor is solidified with the blowing position and strength of the gas. Therefore, a layer in which the material vapor is solidified can be formed efficiently.

In addition, for example, in the method of manufacturing the all-solid battery, the pulse width of the laser beam may be 50 ps or less.

Thus, since an ultrashort pulse laser with a pulse width of 50 ps or less is used, the positive-electrode material and the negative-electrode material are sublimed and removed at the time of cutting by the laser beam, and very fine particles are obtained by cooling. Therefore, the formed positive-electrode fine particle layer and the formed negative-electrode fine particle layer can more easily form an electron conduction path.

Hereinafter, the present embodiment will be described with reference to drawings.

The solid electrolyte layer, the positive-electrode layer, and the negative-electrode layer constituting the all-solid battery and the all-solid battery will be described in detail. The embodiments described below are all inclusive or specific examples. Numerical values, shapes, materials, components, arrangement positions and connection forms of the components, steps, and the like described in the following embodiments are merely examples and are not intended to limit the present disclosure. Further, among the components in the following embodiments, components not described in the independent claims indicating the highest concept are described as random components.

In addition, each drawing is a schematic view in which emphasis, omission, or adjustment of ratio is appropriately performed to show the present disclosure, and is not necessarily strictly illustrated, and may be different from the actual shape, positional relationship, and ratio. In the drawings, substantially the same components are denoted by the same reference numerals, and redundant description may be omitted or simplified.

In addition, in the present specification, a term indicating a relationship between elements such as parallel, a term indicating the shape of an element such as a rectangle, and a numerical range are not limited to expressions representing only strict meanings, but are expressions that are meant to include substantially equivalent ranges, for example, differences of several % or so, and the "same area" is an expression that means within ±5%.

Moreover, in this specification, "inside" and "outside" refer to the inside and outside of the all-solid battery when viewed from a Y-axis direction in FIGS. 1 to 8. That is, the inside and the outside in an X-Z plane are shown.

Further, in the present specification, the "side surface" is a side surface when the all-solid battery is viewed from the Y-axis direction in FIGS. 1 to 8.

In addition, in the present specification, the terms "upper" and "lower" in the laminated configuration of the all-solid battery do not refer to the upward direction (vertically upward) and downward direction (vertically downward) in absolute space recognition, but is used as terms defined by the relative positional relationship based on the laminating order in the layered configuration. Further, the terms "upper" and "lower" are applied not only in a case where two components are spaced apart from one another and another component exists between the two components, but also in a case where two components are placed in intimate contact with each other to make the two components meet.

Further, in the present specification, "in plan view" means a case where the all-solid battery is viewed from the Y-axis direction in FIGS. 1 to 8. That is, the plane in the "plan view" is the X-Z plane in FIGS. 1 to 8.

EXEMPLARY EMBODIMENT 1

A. All-Solid Battery

The all-solid battery in the present embodiment will be described. FIG. 1 is a schematic view showing a cross section of all-solid battery 100 in the present embodiment. As shown in FIG. 1, all-solid battery 100 according to the present embodiment is formed by laminating positive-electrode current collector 1, positive-electrode layer 2 containing a positive-electrode active material, solid electrolyte layer 5 containing a solid electrolyte, negative-electrode layer 4 containing a negative-electrode active material, and negative-electrode current collector 3 in this order. Furthermore, in the state of being in contact with the side surface of positive-electrode layer 2, positive-electrode fine particle layer 6 containing positive-electrode active material fine particles having a particle diameter smaller than that of the positive-electrode active material is formed. In addition, in the state of being in contact with the side surface of negative-electrode layer 4, negative-electrode fine particle layer 8 containing negative-electrode active material fine particles having a particle diameter smaller than that of the negative-electrode active material is formed. Furthermore, solid electrolyte fine particle layer 7 may be formed on the outside of positive-electrode fine particle layer 6, solid electrolyte layer 5, and positive-electrode layer 2. In other words, all-solid battery 100 in the present embodiment includes positive-electrode current collector 1, positive-electrode layer 2, negative-electrode current collector 3, negative-electrode layer 4, solid electrolyte layer 5, positive-electrode fine particle layer 6, solid electrolyte fine particle layer 7, and negative-electrode fine particle layer 8. Positive-electrode current collector 1 is made of metal foil or the like. Positive-electrode layer 2 contains a positive-electrode active material and is formed on positive-electrode current collector 1. Negative-electrode current collector 3 is made of metal foil or the like. Negative-electrode layer 4 contains a negative-electrode active material and is formed on negative-electrode current collector 3. Solid electrolyte layer 5 includes a solid electrolyte having at least ion conductivity and is disposed between positive-electrode layer 2 and negative-electrode layer 4. Positive-electrode fine particle layer 6 contains fine particles of the material contained in positive-electrode layer 2. Solid electrolyte fine particle layer 7 contains fine particles of the material contained in solid electrolyte layer 5. Negative-electrode fine particle layer 8 contains fine particles of the material contained in negative-electrode layer 4. In the present embodiment, positive-electrode current collector 1 is an example of a first current collector, and negative-electrode current collector 3 is an example of a second current collector.

The "particle diameter" in the present specification is a volume-based average particle diameter measured by a laser analysis and scattering particle density distribution measuring device.

All-solid battery 100 may contain a slight amount of a binder that causes at least one of the positive-electrode active material and positive-electrode current collector 1, the positive-electrode active material and solid electrolyte layer 5, the positive-electrode active materials (particles constituting the positive-electrode active material), the negative-electrode active material and negative-electrode current collector 3, the negative-electrode active material and solid electrolyte layer 5, the negative-electrode active materials (particles constituting the negative-electrode active material), and solid electrolyte layers 5 (particles constituting the solid electrolyte) to be in close contact with each other.

Positive-electrode fine particle layer 6 may be formed in contact with the side surface of positive-electrode layer 2, and a part of positive-electrode fine particle layer 6 may cover the side surface of positive-electrode current collector 1. Positive-electrode fine particle layer 6 contains a material of the same component as that of positive-electrode layer 2. The particle diameter of the fine particles of a plurality of materials contained in positive-electrode fine particle layer 6 is smaller than the particle diameter of the particles of the material of the same component contained in positive-electrode layer 2 respectively. For example, the particle diameter of the positive-electrode active material fine particles contained in positive-electrode fine particle layer 6 is smaller than the particle diameter of the particles of the positive-electrode active material contained in positive-electrode layer 2.

Solid electrolyte fine particle layer 7 is formed so as to cover the outside solid electrolyte layer 5, positive-electrode layer 2, and positive-electrode fine particle layer 6 in plan view, and a part of solid electrolyte fine particle layer 7 is a side surface of positive-electrode current collector 1. Solid electrolyte fine particle layer 7 contains a material of the same component as that of solid electrolyte layer 5. The particle diameter of the fine particles of a plurality of materials contained in solid electrolyte particle layer 7 is smaller than the particle diameter of the fine particles of the material of the same component contained in solid electrolyte layer 5 respectively. For example, the particle diameter of the solid electrolyte fine particles contained in solid electrolyte fine particle layer 7 is smaller than the particle diameter of the solid electrolyte particles contained in solid electrolyte layer 5.

Negative-electrode fine particle layer 8 may be formed in contact with the side surface of negative-electrode layer 4, and a part of negative-electrode fine particle layer 8 may cover the side surface of negative-electrode current collector 3. Negative-electrode fine particle layer 8 contains a material of the same component as that of negative-electrode layer 4. The particle diameter of the fine particles of a plurality of materials contained in negative-electrode fine particle layer 8 is smaller than the particle diameter of the particles of the material of the same component contained in negative-electrode layer 4 respectively. For example, the particle diameter of the negative-electrode active material fine particles contained in negative-electrode fine particle layer 8 is smaller than the particle diameter of the particles of the negative-electrode active material contained in negative-electrode layer 4.

Figure 2:
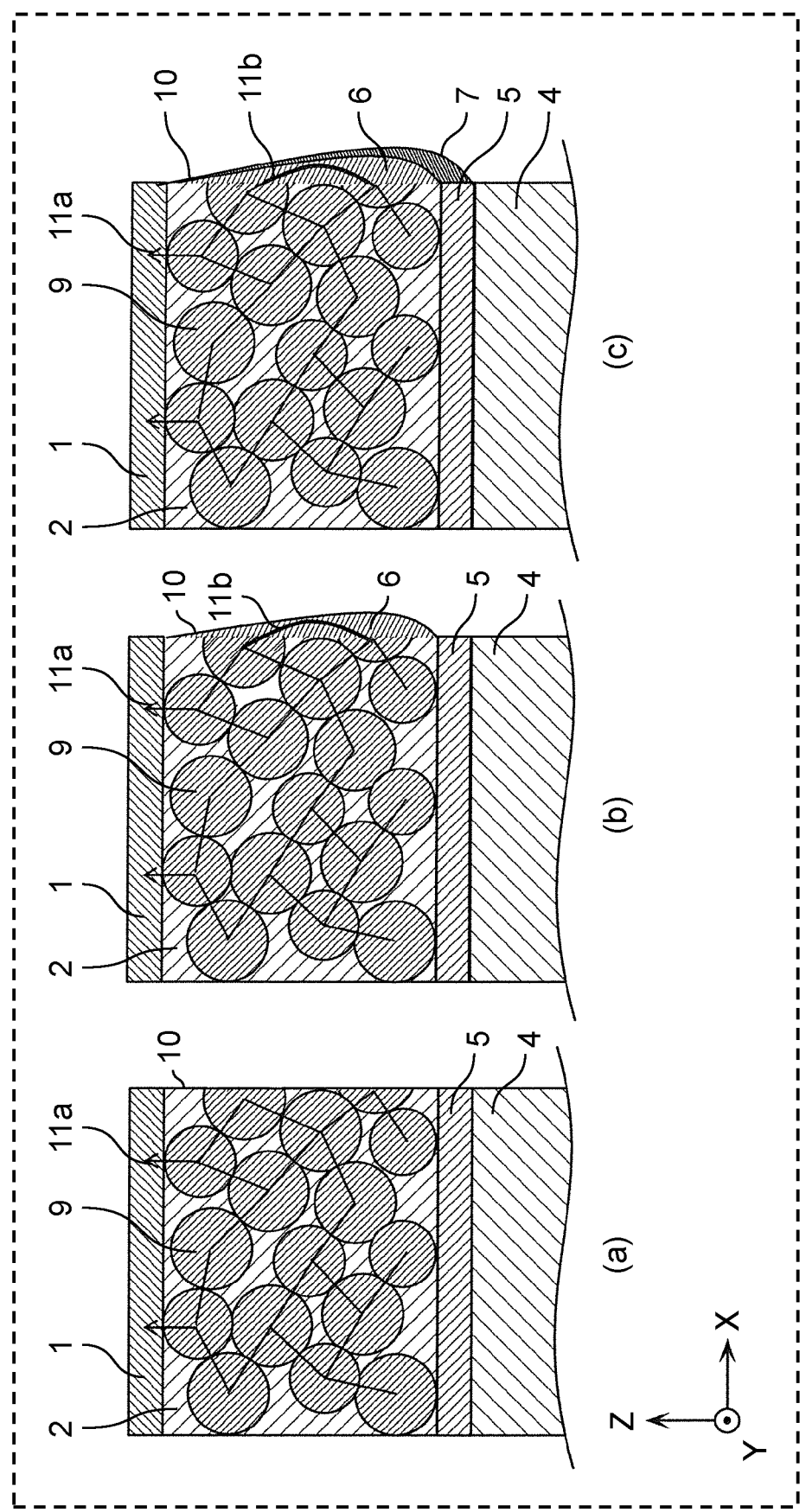
FIG. 2 is a schematic view of a side surface portion of the all-solid battery in EXEMPLARY EMBODIMENT 1 of the present disclosure.

FIG. 2 is a schematic view showing the vicinity of the side surface of positive-electrode layer 2 in all-solid battery 100. Since FIG. 2 is a schematic view for describing the details of positive-electrode fine particle layer 6 and solid electrolyte fine particle layer 7, each component may differ from an actual shape, a positional relationship, and a dimensional ratio. In addition, in FIG. 2, positive-electrode mixture materials other than the positive-electrode active material particles contained in positive-electrode layer 2 are omitted.

(a) of FIG. 2 is a view in a case where positive-electrode fine particle layer 6 and solid electrolyte fine particle layer 7 are not formed on side surface 10 of positive-electrode layer 2. Electron conduction path 11a indicates the flow of current (that is, the direction opposite to the flow of electrons) with an arrow. Electrons flow through the point at which positive-electrode active material particles 9 are in contact with each other. Although not illustrated, in a case where a conductive assistant is contained, electrons pass through the contact point between positive-electrode active material particle 9 and the conductive assistant and the contact point between the conductive assistants. However, since positive-electrode active material particles 9 are cut at side surface 10 of positive-electrode layer 2, the electron conduction path is broken, and the number of electron conduction paths 11a that can be formed is reduced.

(b) of FIG. 2 is a view showing a case where positive-electrode fine particle layer 6 is formed on side surface 10 of positive-electrode layer 2. Since positive-electrode fine particle layer 6 contains a positive-electrode active material to be an electron conduction path, positive-electrode fine particle layer 6 is formed, whereby electron conduction path 11b passing through positive-electrode fine particle layer 6 is newly formed. As a result, the electron conduction efficiency in positive-electrode layer 2 is improved, and the battery capacity of all-solid battery 100 is improved. Although not shown, in a case where positive-electrode layer 2 contains a solid electrolyte, positive-electrode fine particle layer 6 contains fine particles of the solid electrolyte. As a result, the formation of positive-electrode fine particle layer 6 increases the number of ion conduction paths through the fine particles of the solid electrolyte contained in positive-electrode fine particle layer 6 as well as electron conduction path 11b. Thereby, the ion conductivity of lithium ions in positive-electrode layer 2 is improved, and the battery capacity of all-solid battery 100 is improved.

As a range in which positive-electrode fine particle layer 6 is formed, it is desirable that the region is formed at least in a range of the distance between positive-electrode active material particles 9 or the distance between the solid electrolyte particles. Furthermore, it is more desirable that the length of the plane where positive-electrode fine particle layer 6 and positive-electrode layer 2 are in contact with each other in the laminating direction is at least twice the particle diameter of the positive-electrode active material. For example, in a case where the particle diameter of the particles of positive-electrode active material is 10 µm, it is desirable that the length of the plane where positive-electrode fine particle layer 6 and positive-electrode layer 2 are in contact with each other in the laminating direction is 20 µm or more.

Although not shown, negative-electrode fine particle layer 8 is also similar to positive-electrode fine particle layer 6, and the same effect can be obtained.

(c) of FIG. 2 is a view showing a case where positive-electrode fine particle layer 6 is formed on side surface 10 of positive-electrode layer 2 and solid electrolyte fine particle layer 7 is formed on the outside of positive-electrode fine particle layer 6. The contact between positive-electrode fine particle layer 6 and negative-electrode layer 4 or negative-electrode current collector 3 can be suppressed, and the risk of a short circuit can be reduced by forming thin solid electrolyte fine particle layer 7 containing the solid electrolyte fine particles having insulation performance on the outside of positive-electrode fine particle layer 6.

As a range in which solid electrolyte fine particle layer 7 is formed, a part of positive-electrode fine particle layer 6 may be covered. Furthermore, as shown in (c) of FIG. 2, it is preferable that solid electrolyte fine particle layer 7 be formed so as to cover the entire outer surface of positive-electrode fine particle layer 6. In (c) of FIG. 2, positive-electrode fine particle layer 6 is formed so as to cover entire side surface 10 of positive-electrode layer 2, but in a case where there is a region where positive-electrode fine particle layer 6 is not formed on side surface 10 of positive-electrode layer 2, solid electrolyte fine particle layer 7 may be formed on side surface 10 of positive-electrode layer 2.

Figure 3:
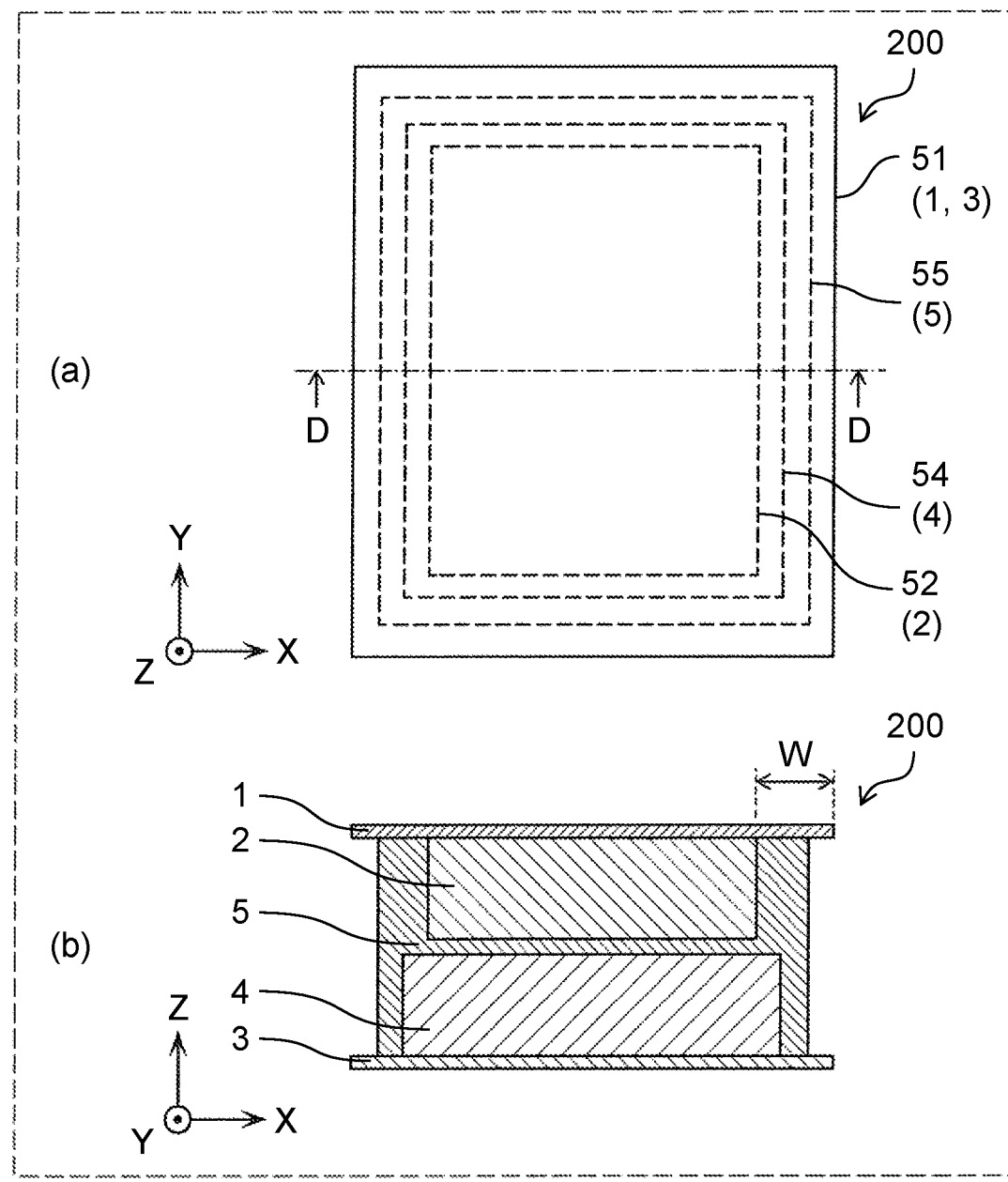
FIG. 3 is a schematic view of the all-solid battery before a laser cutting step in EXEMPLARY EMBODIMENT 1 of the present disclosure.

(a) of FIG. 3 is a top view which shows all-solid battery 200 before the laser cutting step to be described later, that is, after a pressing step. In addition, (b) of FIG. 3 is a cross-sectional view showing a cross section of all-solid battery 200 taken along the line D-D shown in (a) of FIG. 3.

As shown in (a) of FIG. 3, the area of each layer constituting all-solid battery 200 in top view before the laser cutting step and the area of the current collector are: positive-electrode current collector 1=negative-electrode current collector 3≥solid electrolyte layer 5>negative-electrode layer 4>positive-electrode layer 2. Here, the plane in top view is the X-Y plane in FIG. 3. It is desirable that the area of each layer constituting all-solid battery 200 in top view has a relationship of positive-electrode current collector 1=negative-electrode current collector 3≥solid electrolyte layer 5>negative-electrode layer 4>positive-electrode layer 2 or solid electrolyte layer 5≥positive-electrode current collector 1=negative-electrode current collector 3>negative-electrode layer 4>positive-electrode layer 2. In top view, as the areas of positive-electrode current collector 1, negative-electrode current collector 3, and solid electrolyte layer 5 are larger than the areas of negative-electrode layer 4 and positive-electrode layer 2, the side surfaces of positive-electrode current collector 1, negative-electrode current collector 3, and solid electrolyte layer 5 are in an overhanging state, and a short circuit between positive-electrode layer 2 and negative-electrode layer 4 is suppressed.

As shown in FIG. 3, in all-solid battery 200 before the laser cutting step, region W which does not function as a battery is generated between end portion 51 which is the outermost portion of positive-electrode current collector 1 and negative-electrode current collector 3, and end portion 52 which is the outermost portion of positive-electrode layer 2, in relation to end portion 52 of positive-electrode layer, end portion 54 of negative-electrode layer, end portion 55 of solid electrolyte layer, and end portion 51 of positive-electrode current collector and negative-electrode current collector.

In the all-solid battery obtained by the mechanical cutting of the related art, in order to attach a terminal to the all-solid battery in the form shown by FIG. 3 and house the all-solid battery in a case, the all-solid battery will have region W which does not function as a battery in the case. On the other hand, according to the present embodiment, all-solid battery 100 in the present embodiment shown in FIG. 1 has a shape in which region W is reduced by making region W slightly larger than the size in which all-solid battery 200 before the laser cutting step is housed in the case and cutting region W with a laser beam. In a case where the size of all-solid battery 200 is 200×100 mm and region W is reduced from 2.5 mm to 0.1 mm, the volume functioning as a battery, that is, the capacity of the battery can be increased by about 7.6%.

B. Solid Electrolyte Layer

First, solid electrolyte layer 5 in the present embodiment will be described. Although not shown, solid electrolyte layer 5 in the present embodiment includes a solid electrolyte and a binder. As the binder, for example, a binding binder such as a thermoplastic elastomer, a polyvinylidene fluoride, or the like in which a functional group for improving adhesive strength is introduced is used. The binder is preferably a binder that has a functional group that enhances adhesive strength by reacting with and binding to the solid electrolyte, and that achieves high adhesive strength between the solid electrolytes. Solid electrolyte layer 5 may not contain a binder.

B-1. Solid Electrolyte

The solid electrolyte in the present embodiment will be described. The solid electrolyte can be roughly divided into a sulfide-based solid electrolyte and an oxide-based solid electrolyte, and a sulfide-based solid electrolyte may be used or an oxide-based solid electrolyte may be used.

The type of the sulfide-based solid electrolyte in the present embodiment is not particularly limited, but $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, and the like can be mentioned, for example. In particular, it is preferable that the sulfide-based solid electrolyte contains Li, P, and S because the ion conductivity of lithium is excellent. The sulfide-based solid electrolyte may be used alone or in combination of two or more. Further, sulfide-based solid electrolyte containing $P_2S_5$ is preferably used because the reactivity between $P_2S_5$ and the binder is high and the bonding property with the binder is high. The description of "$Li_2S$—$P_2S_5$" means a sulfide-based solid electrolyte formed using a raw material composition containing $Li_2S$ and $P_2S_5$, and the same applies to other descriptions.

In the present embodiment, the sulfide-based solid electrolyte material is, for example, a sulfide-based glass ceramic containing $Li_2S$ and $P_2S_5$, and the ratio of $Li_2S$ and $P_2S_5$ is preferably in the range of 70:30 or more and 80:20 or less, and more preferably in the range of 75:25 or more and 80:20 or less in terms of molar conversion of $Li_2S$: $P_2S_5$. The reason why the ratio of $Li_2S$ to $P_2S_5$ within the above range is preferable is that the crystal structure is high in ion conductivity while maintaining the Li concentration that affects the battery characteristics, and another reason is that the amount of $P_2S_5$ for reacting with and binding to the binder is secured.

The oxide-based solid electrolyte in the present embodiment will be described. The type of the oxide-based solid electrolyte is not particularly limited, but LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, $Li_{1.5}Al_{0.5}Ge_{1.5}(PO_4)_3$ and the like can be mentioned. The oxide-based solid electrolyte may be used alone or in combination of two or more.

Examples of the shape of the positive-electrode active material include a spherical shape, an oval spherical shape, a cubic shape, a prismatic shape, a columnar shape, a needle shape, a scaly shape, and a shape in which these shapes are irregularly combined. The average particle diameter ($D_{50}$) of the solid electrolyte is not particularly limited, but is preferably 10 μm or less because it is easy to improve the density in the layer.

B-2. Binder

The binder in the present embodiment will be described. In the binder in the present embodiment, for example, a functional group for improving the adhesive strength is introduced, and the functional group reacts with the solid electrolyte, bonds the solid electrolytes via the binder, and forms a structure in which the binder is disposed between the solid electrolyte and the solid electrolyte. As a result, the adhesive strength between the solid electrolytes is improved.

The addition amount of the binder in the present embodiment is, for example, preferably in the range of 0.001% by mass or more and 5% by mass or less, more preferably in the range of 0.01% by mass or more and 3% by mass or less, and further more preferably in the range of 0.01% by mass or more and 1% by mass or less. By setting the addition amount of the binder to 0.001% by mass or more, bonding via the binder is likely to occur, and sufficient adhesive strength is easily obtained. Further, by setting the addition amount of the binder to 5% by mass or less, deterioration of the battery characteristics such as charge and discharge characteristics does not easily occur, and further, for example, in a low-temperature region, even if physical property values such as the hardness, tensile strength, and tensile elongation of the binder change, the charge and discharge characteristics are hardly deteriorated.

C. Positive-Electrode Layer

Positive-electrode layer 2 in the present embodiment will be described. Positive-electrode layer 2 in the present embodiment contains a solid electrolyte, a positive-electrode active material, and a binder. Positive-electrode layer 2 may not contain a binder. In a case where positive-electrode layer 2 contains a binder, for example, the positive-electrode active material and the solid electrolyte, the positive-electrode active material and positive-electrode current collector 1, the solid electrolyte and positive-electrode current collector 1, the positive-electrode active materials, and the solid electrolytes adhere to each other through the binder having a functional group introduced therein to improve adhesive strength.

The ratio of the solid electrolyte to the positive-electrode active material is preferably in the range of 50:50 or more and 5:95 or less, and more preferably 30:70 or more and 10:90 in terms of weight conversion of solid electrolyte:positive-electrode active material. The reason for being preferably in the above range is that both the lithium ion conduction path and the electron conduction path in positive-electrode layer 2 can be easily secured. A conductive assistant such as acetylene black or ketjen black may be added to positive-electrode layer 2.

Positive-electrode current collector 1 is made of metal foil or the like, and as a metal of the metal foil, for example, SUS, aluminum, nickel, titanium, copper or the like is used.

C-1. Solid Electrolyte

Since the solid electrolyte is the same as the solid electrolyte described above, the description is omitted.

C-2. Binder

Since the binder is the same as the binder described above, the description is omitted.

C-3. Positive-Electrode Active Material

The positive-electrode active material in the present embodiment will be described. For example, a lithium-containing transition metal oxide is used as the positive-electrode active material in the present embodiment. Examples of the lithium-containing transition metal oxide include $LiCoO_2$, $LiNiO_2$, $LiMn_2O_4$, $LiCoPO_4$, $LiNiPO_4$, $LiFePO_4$, $LiMnPO_4$, and compounds obtained by substituting the transition metal of these compounds with one or two different elements. Examples of the compound obtained by substituting the transition metal of the above-described compounds with one or two different elements include known materials such as $LiNi_{1/3}CO_{1/3}Mn_{1/3}O_2$, $LiNi_{0.8}Co_{0.15}Al_{0.05}O_2$, $LiNi_{0.5}Mn_{1.5}O_2$ and the like. The positive-electrode active material may be used alone or in combination of two or more.

Examples of the shape of the positive-electrode active material include a spherical shape, an oval spherical shape, a cubic shape, a prismatic shape, a columnar shape, a needle shape, a scaly shape, and a shape in which these shapes are irregularly combined. The average particle diameter ($D_{50}$) of the positive-electrode active material is, for example, preferably in the range of 50 nm to 50 μm inclusive, and more preferably in the range of 1 μm to 15 μm inclusive. When the average particle diameter of the positive-electrode active material is 50 nm or more, the handling property is easily improved. On the other hand, by setting the average particle diameter to 50 μm or less, a flat positive-electrode layer is easily obtained, and therefore the above range is preferable.

D. Negative-Electrode Layer

Negative-electrode layer 4 in the present embodiment will be described. Negative-electrode layer 4 in the present embodiment contains a solid electrolyte, a negative-electrode active material, and a binder. Negative-electrode layer 4 may not contain a binder. In a case where negative-electrode layer 4 contains a binder, for example, the negative-electrode active material and the solid electrolyte, the negative-electrode active material and negative-electrode current collector 3, the solid electrolyte and negative-electrode current collector 3, the negative-electrode active materials, and the solid electrolytes adhere to each other through the binder having a functional group introduced therein to improve adhesive strength.

The ratio of the solid electrolyte to the negative-electrode active material is preferably in the range of 5:95 or more and 60:40 or less, and more preferably 30:70 or more and 50:50 or less in terms of weight conversion of solid electrolyte:negative-electrode active material. The reason for being preferably in the above range is that both the lithium ion conduction path and the electron conduction path in negative-electrode layer 4 can be easily secured. A conductive assistant such as acetylene black and ketjen black may be added to negative-electrode layer 4.

Negative-electrode current collector 3 is made of metal foil or the like, and as the metal of the metal foil, for example, SUS, copper, nickel or the like is used.

D-1. Solid Electrolyte

Since the solid electrolyte is the same as the solid electrolyte described above, the description is omitted.

D-2. Binder

Since the binder is the same as the binder described above, the description is omitted.

D-3. Negative-Electrode Active Material

The negative-electrode active material in the present embodiment will be described. As the negative-electrode active material in the present embodiment, for example, metal foil made of a metal that forms an alloy with lithium such as lithium, indium, tin, and silicon, hard carbon, carbon materials such as graphite, or known materials such as $Li_4Ti_5O_{12}$ and SiOx may be used.

Examples of the shape of the negative-electrode active material include a spherical shape, an oval spherical shape, a cubic shape, a prismatic shape, a columnar shape, a needle shape, a scaly shape, and a shape in which these shapes are irregularly combined. The average particle diameter ($D_{50}$) of the negative-electrode active material is, for example, preferably in the range of 50 nm to 50 μm inclusive, and more preferably in the range of 1 μm to 15 μm inclusive. When the average particle diameter of the negative-electrode active material is 50 nm or more, the handling property is easily improved. On the other hand, by setting the average particle diameter to 50 μm or less, a flat negative-electrode layer is easily obtained, and therefore the above range is preferable.

E. Manufacturing Device and Manufacturing Method of All-Solid Battery

Next, a manufacturing method of the all-solid battery according to the present embodiment is described. The method of manufacturing all-solid battery 100 shown in FIG. 1 includes a laminate forming step (not shown) and a laser cutting step. The laminate forming step is a step of forming a laminated structure in which positive-electrode current collector 1, positive-electrode layer 2, solid electrolyte layer 5, negative-electrode layer 4, and negative-electrode current collector 3 are laminated in this order. The laser cutting step is a step of cutting the laminated structure with a laser beam, solidifying the vapor (material vapor) from the laminated structure generated at the time of cutting, and depositing the solidified material on the side surface of positive-electrode layer 2 and the side surface of negative-electrode layer 4. In addition, the manufacturing method of all-solid battery 100 may include a laminate forming step (not shown), a pressing step (not shown), and a laser cutting step. The laminate forming step is a step of forming a laminated structure in which positive-electrode current collector 1, positive-electrode layer 2, solid electrolyte layer 5, negative-electrode layer 4, and negative-electrode current collector 3 are laminated in this order by film formation such as coating step. The pressing step is a step of compressing the laminated structure in order to adjust the filling ratio of each layer to a predetermined filling ratio for solid electrolyte layer 5, positive-electrode layer 2, and negative-electrode layer 4 formed in the laminate forming step. The laser cutting step is a step of cutting the laminated structure with a laser beam, solidifying the material vapor generated at the time of cutting, and depositing the solidified material on the side surface of positive-electrode layer 2 and the side surface of negative-electrode layer 4.

In the laminate forming step, a laminated structure is obtained by forming and laminating positive-electrode layer 2 including the positive-electrode active material formed on positive-electrode current collector 1 made of metal foil or the like, negative-electrode layer 4 including the negative-electrode active material formed on negative-electrode current collector 3 made of metal foil or the like, and solid electrolyte layer 5 containing the solid electrolyte having ion conductivity, disposed between positive-electrode layer 2 and negative-electrode layer 4, respectively. As a method of obtaining a laminated structure, a known method can be used such as a method of forming each layer by forming a film by applying a slurry material to a substrate or the like and laminating the formed layers. In particular, in the case of forming each layer by coating, the above-described non-functional region is likely to be formed because the dimensional accuracy at the time of coating is low.

In the pressing step, the laminate formed in the laminate forming step is pressurized from the outside of positive-electrode current collector 1 and negative-electrode current collector 3, and all-solid battery 200 before the laser cutting step, which is a compressed laminated structure, is obtained. Thereby, the filling ratio of at least one layer of solid electrolyte layer 5, positive-electrode layer 2, and negative-electrode layer 4 becomes 60% or more and less than 100%, and in at least one layer in solid electrolyte layer 5, positive-electrode layer 2, and negative-electrode layer 4, the number of voids is reduced. As a result, lithium ion conductivity and electron conductivity are improved, and good charge and discharge characteristics can be obtained. The filling ratio is the ratio of the volume occupied by the material excluding the voids in the total volume of each layer.

The laser cutting step is a step of cutting the laminated structure with a laser beam, solidifying the vapor from the laminated structure generated at the time of cutting, and depositing the solidified material on the side surface of positive-electrode layer 2 and the side surface of negative-electrode layer 4. The solidified material is brought into contact with the side surface of the positive-electrode layer 2 to form positive-electrode fine particle layer 6 containing positive-electrode active material fine particles having a particle diameter smaller than that of the positive-electrode active material. In addition, the solidified material is brought into contact with the side surface of negative-electrode layer 4 to form negative-electrode fine particle layer 8 containing negative-electrode active material fine particles having a particle diameter smaller than that of the negative-electrode active material. Also, in the laser cutting step, the material vapor may be solidified by blowing a gas, and the solidified material may be deposited.

Figure 4:
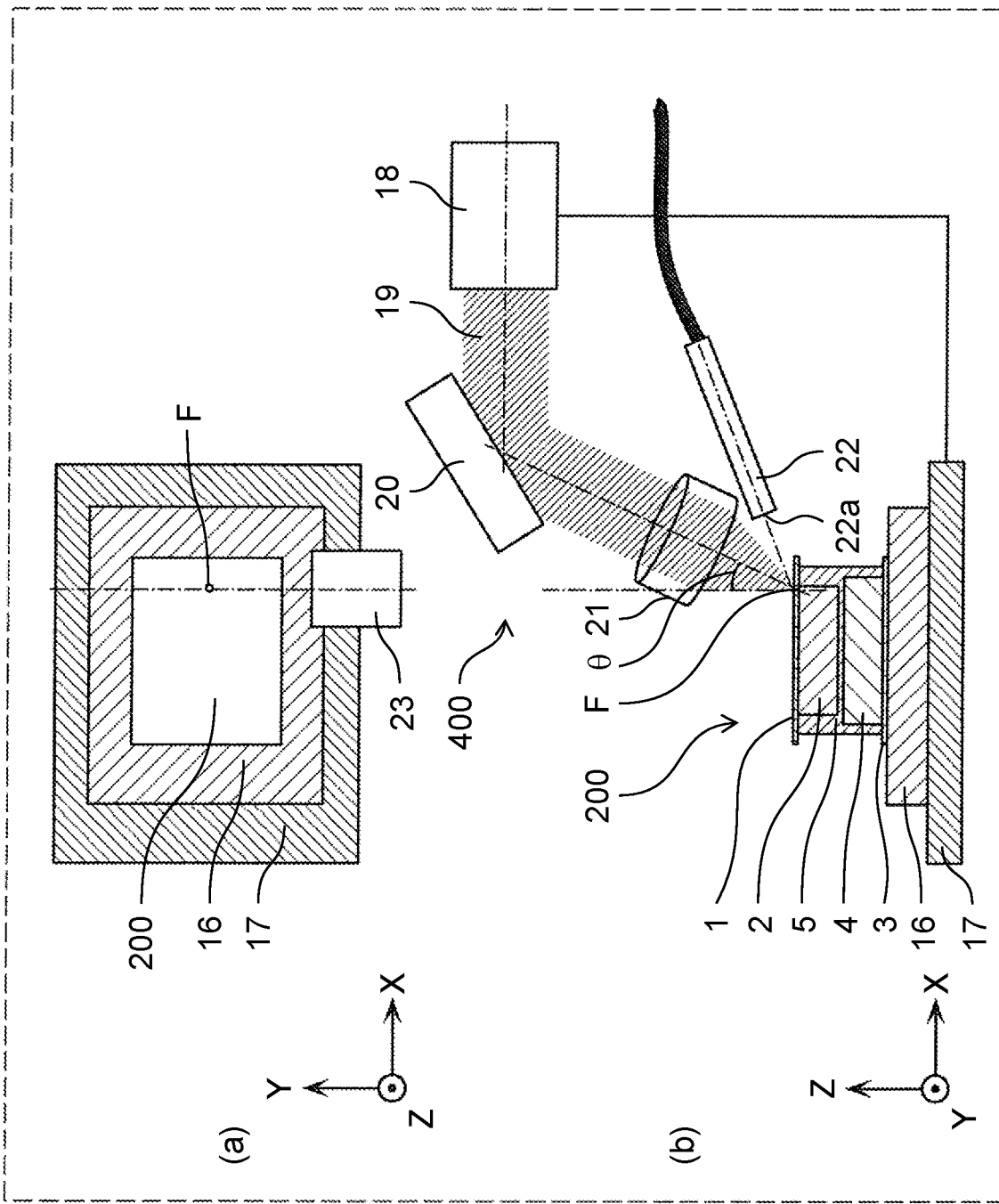
FIG. 4 is a schematic view of a laser processing apparatus in EXEMPLARY EMBODIMENT 1 of the present disclosure.

FIG. 4 is a schematic view of laser processing apparatus 400 in the manufacturing method according to the present embodiment. FIG. 4 shows a state in which all-solid battery 200 before the laser cutting step is fixed to laser processing apparatus 400. (a) of FIG. 4 is a top view of laser processing apparatus 400 and all-solid battery 200, and (b) of FIG. 4 is a cross-sectional view of laser processing apparatus 400 and all-solid battery 200.

Laser processing apparatus 400 includes fixed table 16, drive stage 17, laser oscillator 18 that emits laser beam 19, mirror 20, lens 21, blower 22, and dust collector 23. In (a) of FIG. 4, components other than fixed table 16, drive stage 17, dust collector 23, and all-solid battery 200 are omitted.

Fixed table 16 fixes all-solid battery 200 thereon by, for example, vacuum suction. As fixed table 16, one that does not cause positional deviation of all-solid battery 200 due to driving by drive stage 17 described later is used.

Drive stage 17 can drive fixed table 16 installed on drive stage 17 in the three axial directions of XYZ and controls the relative position of the laser beam with respect to all-solid battery 200 fixed to fixed table 16.

Laser oscillator 18 emits laser beam 19 having a maximum repetition frequency of 1 MHz which is a picosecond laser having a wavelength at which all-solid battery 200 has an absorption rate of 10% or more, for example, a wavelength of 1064 nm, a pulse width of 50 ps or less, and a maximum output of 100 W. In cutting positive-electrode current collector 1, negative-electrode current collector 3, positive-electrode layer 2, negative-electrode layer 4, and solid electrolyte layer 5, laser oscillator 18 desirably uses an ultrashort pulse laser having a pulse width of 50 ps or less in order to suppress the change in quality due to heat at the time of cutting and deterioration of the processed shape. In addition, laser oscillator 18 can perform ON/OFF control of the laser beam by exchanging a control signal with drive stage 17.

Laser beam 19 is a laser beam emitted from laser oscillator 18 and is a linearly polarized laser beam.

Mirror 20 is a mirror that can reflect laser beam 19 emitted from laser oscillator 18 by 90% or more and transmit the laser beam to the processing location, and can adjust irradiation angle θ of laser beam 19 to all-solid battery 200. As mirror 20 in the present embodiment, for example, a dielectric multilayer mirror that reflects a wavelength of 1064 nm is used.

Lens 21 condenses parallel laser beam 19 so that laser beam 19 is concentrated at the processing location of all-solid battery 200, and as lens 11 in the present embodiment, a lens with a focal length of 40 mm that transmits a wavelength of 1064 nm by 50% or more is used.

Blower 22 is for blowing the gas emitted from blowing portion 22a to the material vapor generated at processing point F and can move blowing portion 22a. The gas blown by blower 22 is not particularly limited as long as the gas does not deteriorate the material used for the all-solid battery and is, for example, an inert gas such as argon. Nitrogen gas, dry air, and air may be used in the range which does not deteriorate a positive-electrode active material, a negative-electrode active material, and a solid electrolyte as a gas to blow.

Dust collector 23 is a suction machine for suctioning dust generated at processing point F. Dust collector 23 may be fixed or movable.

Figure 5:
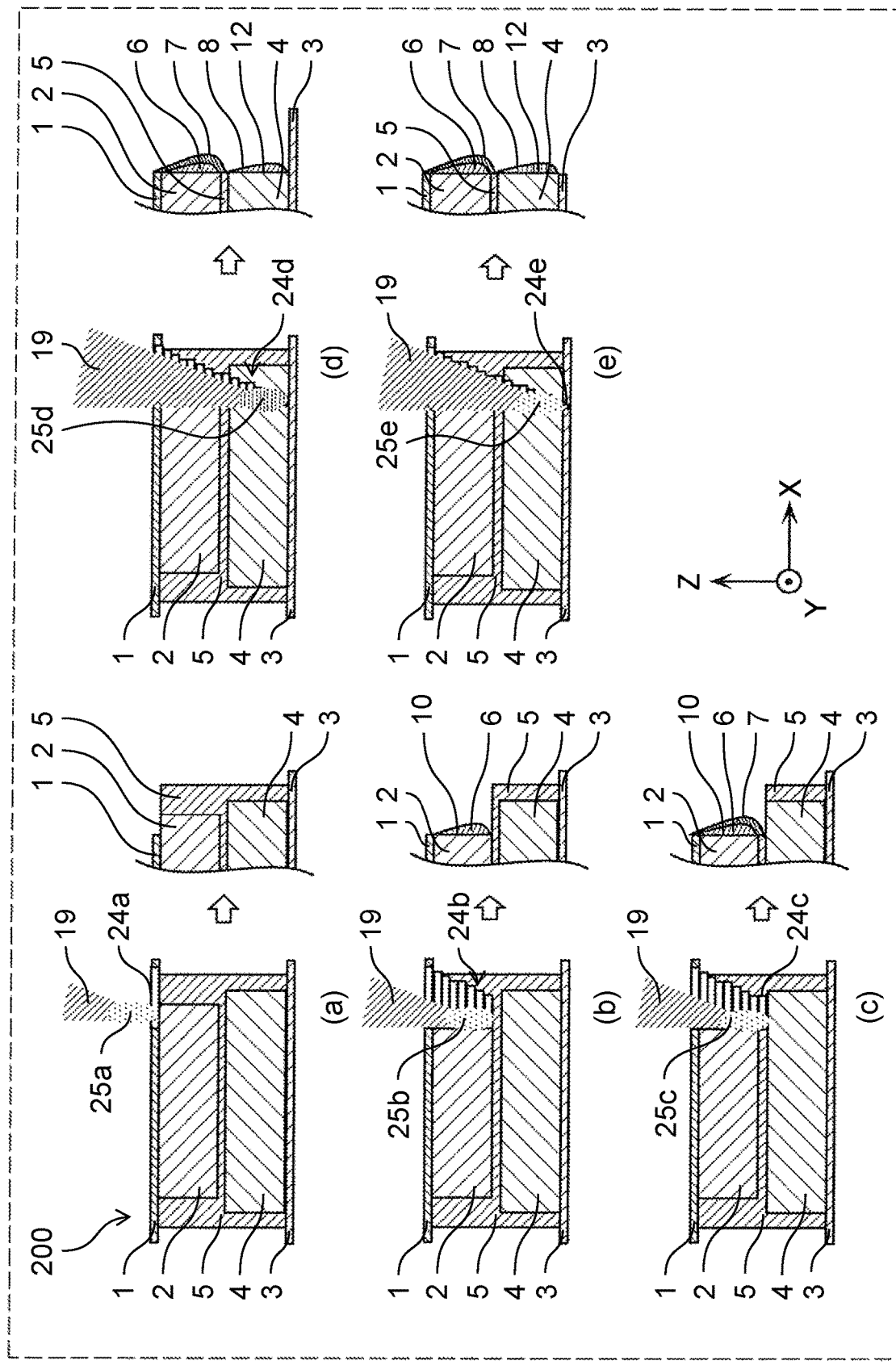
FIG. 5 is a schematic view of a cutting method of the all-solid battery in EXEMPLARY EMBODIMENT 1 of the present disclosure.

Next, the operation of laser processing apparatus 400 according to the present embodiment will be described with reference to FIG. 5. FIG. 5 is a schematic view showing a cutting method by laser processing of all-solid battery 200 before the laser cutting step, and the laser cutting step of the manufacturing method of the all-solid battery in the present embodiment will be described below. FIG. 5 shows only the cross section of all-solid battery 200 and laser beam 19, and the other components of laser processing apparatus 400 are omitted. Further, in (a) to (e) of FIG. 5, the views on the left side of the arrows are the views when all-solid battery 200 is irradiated with laser beam 19. The views on the right of the arrows show the state of all-solid battery 200 after being irradiated with laser beam 19.

First, laser beam 19 is focused on the uppermost surface of positive-electrode current collector 1 and laser beam 19 is scanned in the direction (Y-axis direction) perpendicular to the drawing to form a linear groove in the Y-axis direction. Next, the focal point of laser beam 19 is moved in the X-axis direction, and scanning of laser beam 19 in the direction (Y-axis direction) perpendicular to the drawing is repeated to perform removal processing while connecting linear grooves in the Y-axis direction in the X-axis direction. Thereby, planar removal portion 24a is formed in positive-electrode current collector 1, and positive-electrode layer 2 is exposed. At this time, by operating dust collector 23 (see (a) of FIG. 4), vapor component 25a generated by sublimation of the material when removing positive-electrode current collector 1 is removed ((a) of FIG. 5).

Next, laser beam 19 is focused on exposed positive-electrode layer 2 and laser beam 19 is scanned in the direction (Y-axis direction) perpendicular to the drawing to form a linear groove in the Y-axis direction. Then, the focal point of laser beam 19 is moved in the X-axis direction, and scanning of laser beam 19 in the direction (Y-axis direction) perpendicular to the drawing is repeated to perform removal processing while connecting the linear grooves in the Y-axis direction in the X-axis direction and form a removal portion in the form of an elongated surface in the Y-axis direction in positive-electrode layer 2 and solid electrolyte layer 5. Furthermore, removal processing is performed while moving the focal position of laser beam 19 in the depth direction, and a removal portion in the form of an elongated surface elongated in the Y-axis direction is superimposed. Thereby, removal portion 24b is formed which extends over the entire positive-electrode layer 2 (the lower surface of positive-electrode layer 2) in the thickness direction. At this time, blower 22 (see (b) of FIG. 4) is operated, a gas is blown toward side surface 10 of positive-electrode layer 2 from blowing portion 22a of blower 22 to cool vapor component 25b of the positive-electrode mixture material generated by the sublimation of the material when removing positive-electrode layer 2. As a result, vapor component 25b is precipitated as fine particles on side surface 10 of positive-electrode layer 2 to form positive-electrode fine particle layer 6 ((b) of FIG. 5). Vapor component 25b is a positive-electrode material mixture material which is sublimed and removed by a short pulse laser and becomes very fine particles by being cooled.

Also in case where solid electrolyte layer 5, negative-electrode layer 4 and negative-electrode current collector 3 are removed, the same method as the method of removing positive-electrode current collector 1 and positive-electrode layer 2 can be used.

As shown in (c) of FIG. 5, when forming removal portion 24c of solid electrolyte layer 5, a gas is blown toward side surface 10 of positive-electrode layer 2 from blowing portion 22a of blower 22. Thereby, vapor component 25c of the solid electrolyte is cooled and precipitated as fine particles, and solid electrolyte fine particle layer 7 is formed on the outside of positive-electrode fine particle layer 6 in plan view. As shown in (d) of FIG. 5, when forming removal portion 24d of negative-electrode layer 4, a gas is blown toward side surface 12 of negative-electrode layer 4 from blowing portion 22a of blower 22. Thereby, vapor component 25d of negative-electrode mixture material is cooled and precipitated as fine particles, and negative-electrode fine particle layer 8 is formed on the outside of negative-electrode layer 4 in plan view. As shown in (e) of FIG. 5, when forming removal portion 24e of negative-electrode current collector 3, dust collector 23 removes vapor component 25e of negative-electrode current collector 3. Thereby, the fine particles of the negative-electrode current collector material do not form a layer on the outside of positive-electrode fine particle layer 6 at least in plan view. Even if the fine particles of the negative-electrode current collector material are present on the outside of positive-electrode fine particle layer 6, the fine particles of negative-electrode current collector material only remain discretely. The state shown by (e) of FIG. 5 is the state in which the cutting in the thickness direction of each layer is completed.

In addition, for example, in the case of superimposing a plurality of removal portions as in removal portion 24b of positive-electrode layer 2, in positive-electrode fine particle layer 6 and negative-electrode fine particle layer 8 precipitated on the side surfaces of positive-electrode layer 2 and negative-electrode layer 4, the amount of fine particles precipitated is larger on the lower side of positive-electrode fine particle layer 6. That is, the amount of formation of positive-electrode fine particle layer 6 tends to be large. It is considered that the reason is that the density of the vapor component is higher near the processing point and it is easy to precipitate the vapor component when removing and processing the lower side of positive-electrode layer 2 and further, the outer peripheral portion of laser beam 19 may hit fine particles precipitated on the upper side of side surface 10 of positive-electrode layer 2 and cause some of the fine particles to evaporate.

In the above description, when removing positive-electrode layer 2, solid electrolyte layer 5, and negative-electrode layer 4 respectively, it is possible to remove the lower layer so that laser beam 19 is not blocked when processing the lower layer and to cut each layer more efficiently by securing a space to be irradiated with the laser beam. That is, a width at which the laser beam 19 is not blocked may be secured and the layers may be removed so as to complete removal processing of all layers at one time.

FIG. 5 shows an example in which removal processing is performed by using laser beam 19. However, another laser beam different from laser beam 19 may be further used as the laser beam used for the removal processing. For example, a laser beam emitted from a solid-state laser having a wavelength of 355 nm, a pulse width of 40 ns, and a frequency of 500 kHz and collected by a lens having a focal length of 100 mm may be used as another laser beam. Such a laser beam has a large pulse width and therefore has a large removal amount compared to laser beam 19 but has a feature that the dimensional accuracy is low and the thermal influence is also large. Therefore, efficient processing is possible by removing the region which is far from the portion functioning as the battery and in which the heat of removal processing and the like do not easily affect the battery characteristics by using the other laser beam described above, and then removing the region close to the portion functioning as the battery by using laser beam 19.

Alternatively, a plurality of all-solid batteries 200 may be laminated, and the plurality of laminated all-solid batteries 200 may be simultaneously cut by using a laser. Further, when processing with laser beam 19, a laser beam multi-branched in the XYZ axis direction by a diffractive optical element or the like may be used so that the removal portion by laser beam 19 is continuous. By performing batch processing using a multi-branched laser beam, more efficient processing is possible.

In FIG. 5, although laser beam 19 is irradiated from positive-electrode current collector 1 side, laser beam 19 may be irradiated from negative-electrode current collector 3 side. When irradiating the laser beam 19 from negative-electrode current collector 3 side, in order to remove negative-electrode layer 4 before removing solid electrolyte layer 5, solid electrolyte fine particle layer 7 is formed on the outside of negative-electrode fine particle layer 8.

In addition, in the above-described laser cutting step, blower 22 was used as a method of precipitating and depositing the vapor component of the evaporated material. However, a part of the evaporated material may be precipitated on the side surfaces of positive-electrode layer 2 and negative-electrode layer 4 by adjusting the conditions of dust collector 23.

Furthermore, in the present embodiment, a structure in which positive-electrode layer 2, negative-electrode layer 4, and solid electrolyte layer are sandwiched between positive-electrode current collector 1 and negative-electrode current collector 3 is used. However, the present disclosure is not limited to this structure. It is also possible to use a structure in which negative-electrode layer 4 and solid electrolyte layer 5 are formed on the lower surface side (upper surface side) opposite to the surface on which positive-electrode layer 2, solid electrolyte layer 5, and positive-electrode layer 2 are formed on the upper surface side (lower surface side) of the current collector with the current collector interposed therebetween.

By processing the laminated structure by the above-described laser cutting step, for example, all-solid battery 100 shown in FIG. 1 is obtained. A terminal is attached to the obtained all-solid battery 100 and stored in a case. As a case of all-solid battery 100, for example, a case made of an aluminum laminated bag, SUS, iron, aluminum, or resin is used.

EXEMPLARY EMBODIMENT 2

EXEMPLARY EMBODIMENT 2 will be described below. In the following description, differences from the above-described EXEMPLARY EMBODIMENT 1 will be mainly described, and the description of the common points will be appropriately omitted or simplified.

A. All-Solid Battery

Figure 6:
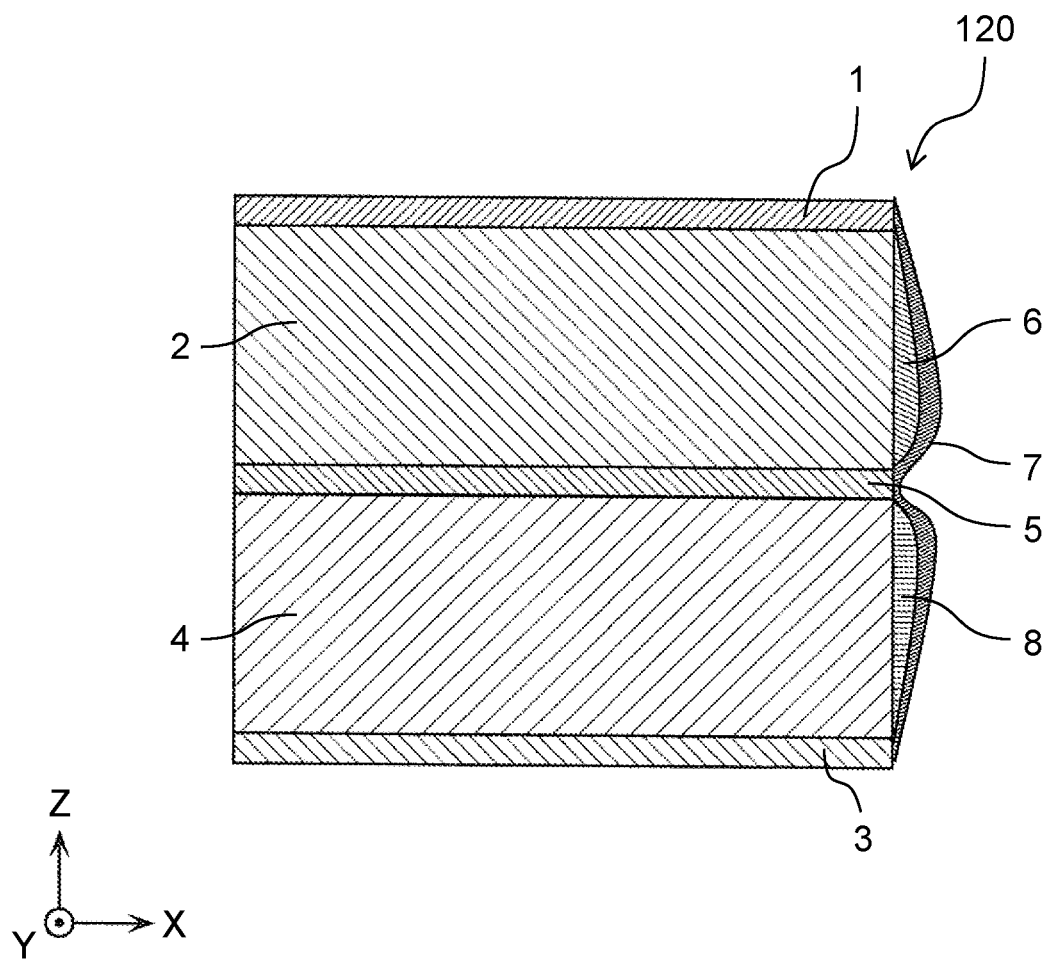
FIG. 6 is a schematic view of an all-solid battery in EXEMPLARY EMBODIMENT 2 of the present disclosure.

FIG. 6 is a schematic view showing a cross section of all-solid battery 120 in EXEMPLARY EMBODIMENT 2. As shown in FIG. 6, all-solid battery 120 according to the present embodiment is formed by laminating positive-electrode current collector 1, positive-electrode layer 2 containing a positive-electrode active material, solid electrolyte layer 5 containing a solid electrolyte, negative-electrode layer 4 containing a negative-electrode active material, and negative-electrode current collector 3 in this order. Furthermore, positive-electrode fine particle layer 6 may be formed in contact with the side surface of positive-electrode layer 2, and a part of positive-electrode fine particle layer 6 may cover the side surface of positive-electrode current collector 1. The particle diameter of the fine particles of a plurality of materials contained in positive-electrode fine particle layer 6 is smaller than the particle diameter of the particles of the material of the same component contained in positive-electrode layer 2 respectively.

Negative-electrode fine particle layer 8 may be formed on the side surface of negative-electrode layer 4, and a part of negative-electrode fine particle layer 8 may cover the side surface of negative-electrode current collector 3. The particle diameter of the fine particles of a plurality of materials contained in negative-electrode fine particle layer 8 is smaller than the particle diameter of the particles of the material of the same component contained in negative-electrode layer 4 respectively.

Solid electrolyte fine particle layer 7 is formed to cover the outside of positive-electrode layer 2, positive-electrode fine particle layer 6, solid electrolyte layer 5, negative-electrode layer 4, and negative-electrode fine particle layer 8 in plan view. A part of solid electrolyte fine particle layer 7 may cover the side surface of positive-electrode current collector 1 and the side surface of negative-electrode current collector 3. The particle diameter of the fine particles of a plurality of materials contained in solid electrolyte fine particle layer 7 is smaller than the particle diameter of the particles of the material of the same component contained in solid electrolyte layer 5 respectively.

B. Solid Electrolyte Layer

Since the solid electrolyte layer is the same as that of EXEMPLARY EMBODIMENT 1, the description thereof is omitted.

C. Positive-Electrode Layer

Since the positive-electrode layer is the same as that of EXEMPLARY EMBODIMENT 1, the description thereof is omitted.

D. Negative-Electrode Layer

Since the negative-electrode layer is the same as that of EXEMPLARY EMBODIMENT 1, the description thereof is omitted.

E. Manufacturing Device and Manufacturing Method of All-Solid Battery

Next, the manufacturing method of the all-solid battery in EXEMPLARY EMBODIMENT 2 is described. The manufacturing method of the all-solid battery according to EXEMPLARY EMBODIMENT 2 is the same as that of EXEMPLARY EMBODIMENT 1 except the processing method in the laser cutting step, and therefore, the laser cutting step will be mainly described.

Figure 7:
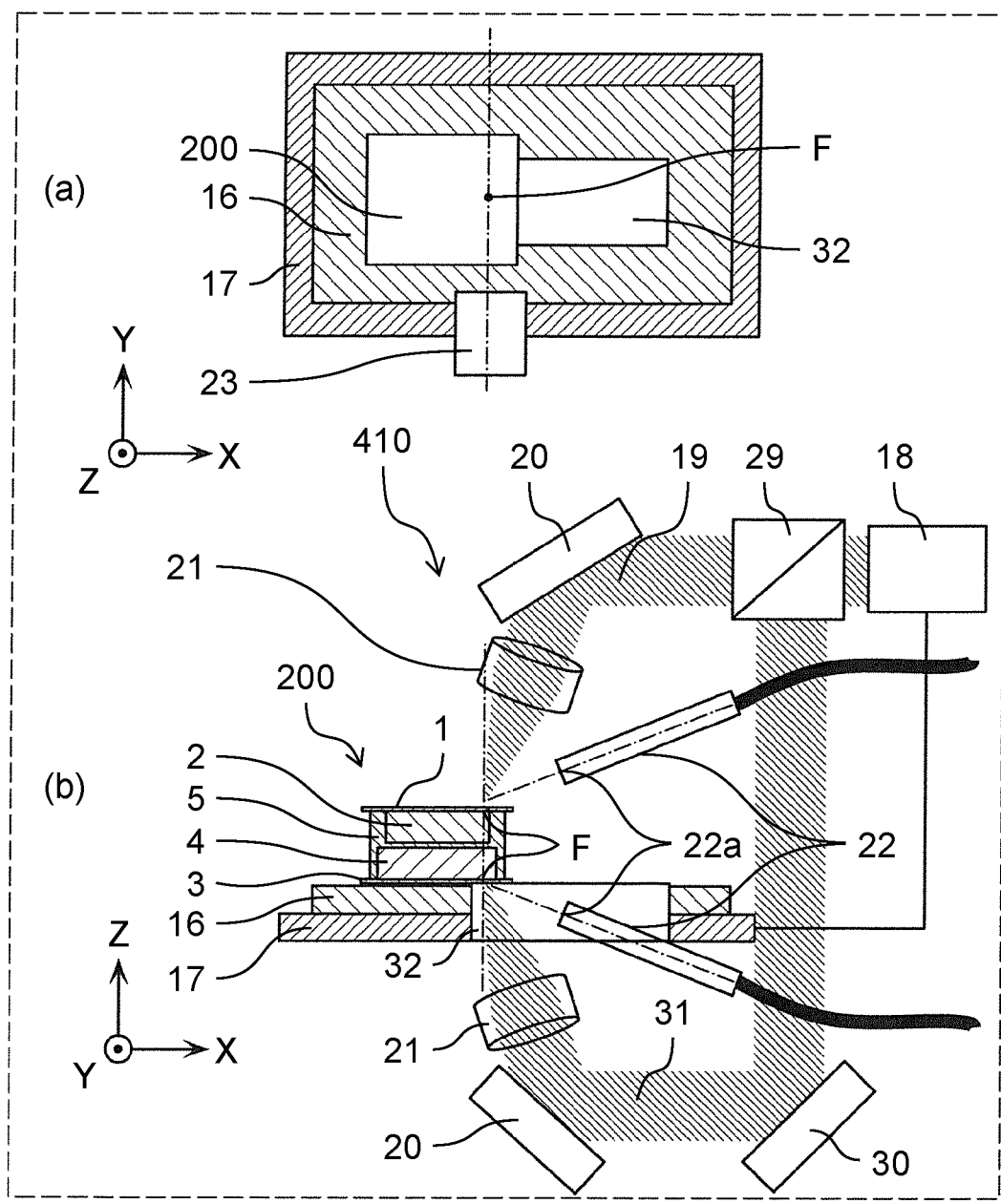
FIG. 7 is a schematic view of a laser processing apparatus in EXEMPLARY EMBODIMENT 2 of the present disclosure.

FIG. 7 is a schematic view showing laser processing apparatus 410 used in the manufacturing method of the all-solid battery according to EXEMPLARY EMBODIMENT 2. FIG. 7 shows a state in which all-solid battery 200 before the laser cutting step is fixed to laser processing apparatus 410. (a) of FIG. 7 is a top view of laser processing apparatus 410 and all-solid battery 200. (b) of FIG. 7 is a cross-sectional view of laser processing apparatus 410 and all-solid battery 200.

Laser processing apparatus 410 includes fixed table 16, drive stage 17, laser oscillator 18 that emits laser beam 19, mirror 20, lens 21, blower 22, dust collector 23, half mirror 29, folding mirror 30, and processing portion 32. In (a) of FIG. 7, components other than fixed table 16, drive stage 17, dust collector 23, processing portion 32, and all-solid battery 200 are omitted.

Half mirror 29 divides the laser beam into laser beam 19 irradiated to positive-electrode layer 2 side and laser beam 31 irradiated to negative-electrode layer 4 side by a power distribution of 1:1.

Folding mirror 30 is a mirror that has a reflectance of 90% or more and can determine the propagation path of laser beam 31. Laser beam 19 is reflected by folding mirror 30 and mirror 20 and is transmitted to the processing location on negative-electrode layer 4 side of all-solid battery 200.

Processing portion 32 is a hole provided in fixed table 16 and drive stage 17 along the planned processing shape of the all-solid battery and is formed so as not to block laser beam 31. Processing portion 32 allows laser beam 31 to pass through fixed table 16 and drive stage 17, and the gas ejected from blower 22 can reach processing point F with almost no loss.

Since laser beam 19 and the laser beam 31 are irradiated to the all-solid battery 200 in laser processing apparatus 410, laser processing apparatus 410 is provided with two mirrors 20, two lenses 21, and two blowers 22.

Figure 8:
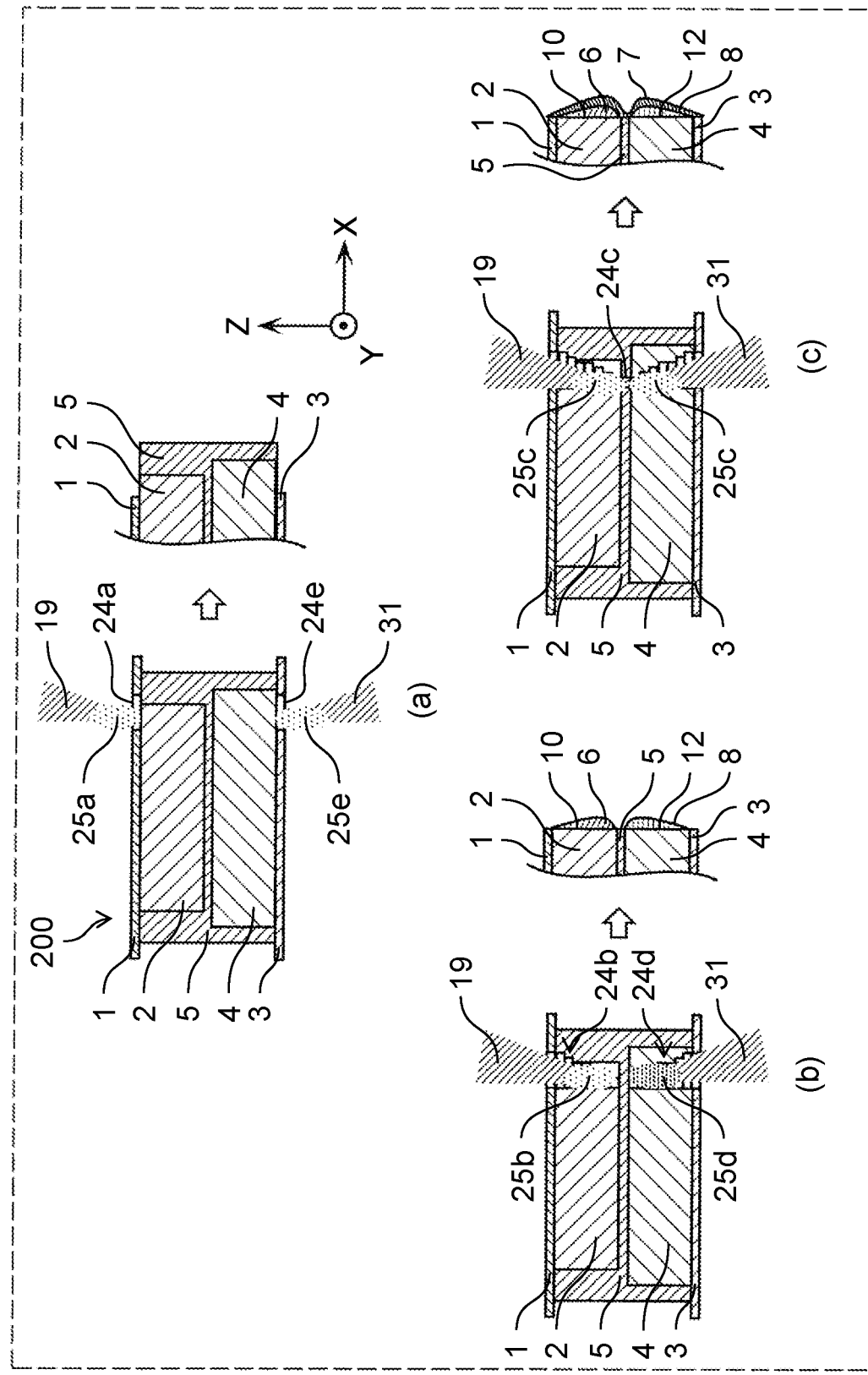
FIG. 8 is a schematic view of a cutting method of the all-solid battery in EXEMPLARY EMBODIMENT 2 of the present disclosure.
Figure 9:
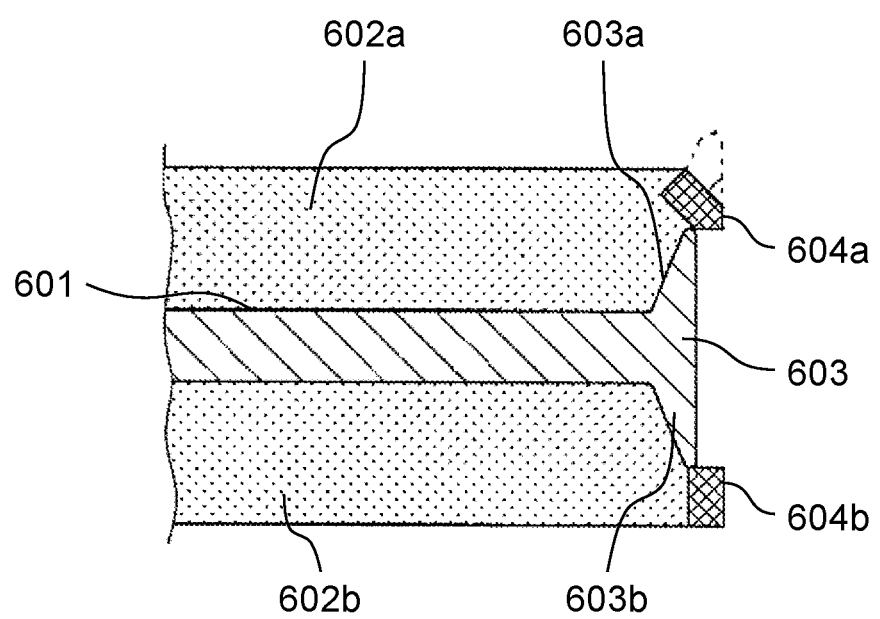
FIG. 9 is a schematic view of a conventional all-solid battery.

Next, the operation of laser processing apparatus 410 according to EXEMPLARY EMBODIMENT 2 will be described with reference to FIG. 8. FIG. 8 shows only the cross section of all-solid battery 200, laser beam 19, and laser beam 31, and other components of the laser processing apparatus 410 are omitted. Further, in (a) of FIG. 8 to (c) of FIG. 8, the views on the left side of the arrows are the views when all-solid battery 200 is irradiated with laser beam 19 and laser beam 31. The views on the right side of the arrows show the state of all-solid battery 200 after being irradiated with laser beam 19 and laser beam 31.

First, as shown in (a) of FIG. 8, laser beam 19 is focused on the uppermost surface of positive-electrode current collector 1 and laser beam 19 is scanned in the direction (Y-axis direction) perpendicular to the drawing to form a linear groove in the Y-axis direction. Then, the focal point of laser beam 19 is moved in the X-axis direction, and scanning of laser beam 19 in the direction (Y-axis direction) perpendicular to the drawing is repeated to perform removal processing while connecting linear grooves in the Y-axis direction in the X-axis direction. As a result, removal portion 24a in the form of an elongated surface in the Y-axis direction is formed on positive-electrode current collector 1, and positive-electrode layer 2 is exposed. At this time, by operating dust collector 23, vapor component 25a generated by sublimation of the material when removing positive-electrode current collector 1 is removed.

The removal of negative-electrode current collector 3 is the same operation as that of positive-electrode current collector 1, but laser beam 31 is irradiated from the opposite side of positive-electrode current collector 1, and laser beam 31 is focused on the uppermost surface of negative-electrode current collector 3, and removal portion 24e in the form of an elongated surface in the Y-axis direction is formed on negative-electrode current collector 3. When forming removal portion 24e, vapor component 25e of negative-electrode current collector is removed by dust collector 23.

Next, as shown in (b) of FIG. 8, laser beam 19 is focused on the exposed positive-electrode layer 2, and laser beam 19 is scanned in the direction (Y-axis direction) perpendicular to the drawing to form a linear groove in the Y-axis direction. Then, the focal point of laser beam 19 is moved in the X-axis direction, and scanning of laser beam 19 in the direction (Y-axis direction) perpendicular to the drawing is repeated to perform removal processing while connecting linear grooves in the Y-axis direction in the X-axis direction. As a result, a removal portion in the form of an elongated surface in the Y-axis direction is formed in positive-electrode layer 2 and solid electrolyte layer 5. Furthermore, the above removal processing is performed while moving the focal position of laser beam 19 in the depth direction, and removal portion 24b is formed which extends over the entire positive-electrode layer 2 (the lower surface of positive-electrode layer 2) in the thickness direction by superimposing the removal portion in the form of an elongated surface in the Y-axis direction. At this time, blower 22 is operated, a gas is blown toward the end portion of positive-electrode layer 2 from blowing portion 22a of blower 22 to cool vapor component 25b of the positive-electrode mixture material generated by the sublimation of the material when removing positive-electrode layer 2. As a result, vapor component 25b is precipitated as fine particles on side surface 10 of positive-electrode layer 2 to form positive-electrode fine particle layer 6. Vapor component 25b is a positive-electrode material mixture material which is sublimed and removed by a short pulse laser and becomes very fine particles by being cooled.

The operation of negative-electrode layer 4 is the same as that of positive-electrode layer 2 except that laser beam 31 is irradiated from the opposite side of positive-electrode layer 2 to focus laser beam 31 on the exposed negative-electrode layer 4. Then, removal portion 24d is formed which extends over the entire negative-electrode layer 4 (the upper surface of negative-electrode layer 4) in the thickness direction by superimposing the removal portion in the form of an elongated surface in the Y-axis direction. When forming removal portion 24d, vapor component 25d of the negative-electrode mixture material is cooled by blowing the gas by blowing a gas toward side surface 12 of negative-electrode layer 4 from blowing portion 22a of blower 22. As a result, vapor component 25d is precipitated as fine particles on side surface 12 of negative-electrode layer 4, and negative-electrode fine particle layer 8 is formed on the outside of side surface 12 of negative-electrode layer 4.

As shown in (c) of FIG. 8, with respect to solid electrolyte layer 5, the removal is carried out in the same manner as described above with reference to both positive-electrode layer 2 side and negative-electrode layer 4 side to the center of solid electrolyte layer 5 in the thickness direction to form removal portion 24c. When forming removal portion 24c, a gas is blown toward side surface 10 of positive-electrode layer 2 and side surface 12 of negative-electrode layer 4 from blowing portion 22a of blower 22. Then, vapor component 25c of the solid electrolyte layer material is precipitated on the outside of positive-electrode fine particle layer 6 and negative-electrode fine particle layer 8 to form solid electrolyte fine particle layer 7.

Positive-electrode current collector 1 and negative-electrode current collector 3 may be simultaneously removed as shown in (a) of FIG. 8, and then positive-electrode layer 2 and negative-electrode layer 4 may be simultaneously removed as shown in (b) of FIG. 8, and then solid electrolyte layer 5 may be simultaneously removed from the upper side and the lower side as shown in (c) of FIG. 8. Alternatively, although not shown, negative-electrode layer 4 side may be removed after positive-electrode layer 2 side is removed. Alternatively, after negative-electrode layer 4 side is removed, positive-electrode layer 2 side may be removed.

Also in the present embodiment, although not shown, another laser beam different from laser beam 19 and laser beam 31 may be combined, and batch removal processing may be performed by using a laser beam multi-branched by a diffractive optical element or the like. In addition, as a method of precipitating and depositing the vapor component of the evaporated material, blower 22 was used, but a part of the evaporated material may be precipitated on the side surfaces of positive-electrode layer 2 and negative-electrode layer 4 by adjusting the conditions of dust collector 23.

OTHER EXEMPLARY EMBODIMENTS

As described above, the all-solid battery according to the present disclosure has been described based on a plurality of embodiments, but the present disclosure is not limited to these embodiments. Without departing from the gist of the present disclosure, various modifications made to the embodiments by those skilled in the art or another form constructed by combining some components in the embodiments is also within the scope of the present disclosure.

For example, in EXEMPLARY EMBODIMENT 1 and EXEMPLARY EMBODIMENT 2, a laser oscillator having a wavelength of 1064 nm and a pulse width of 50 ps or less is used, but the present disclosure is not limited thereto, and the laser oscillator may be changed depending on the material and the processing shape. In addition, in EXEMPLARY EMBODIMENT 1 and EXEMPLARY EMBODIMENT 2, a lens with a focal length of 40 mm is used, but the lens may be changed depending on the processing accuracy and the depth of focus, and the same effect can be obtained by using an fθ lens in combination with the galvano scanning system.

In EXEMPLARY EMBODIMENT 1 and EXEMPLARY EMBODIMENT 2, a positive-electrode fine particle layer and a negative-electrode fine particle layer are formed on one side surface of a positive-electrode layer and a negative-electrode layer, respectively, but the positive-electrode fine particle layer and the negative-electrode fine particle layer may be formed on two or more side surfaces.

In EXEMPLARY EMBODIMENT 1 and EXEMPLARY EMBODIMENT 2, the all-solid battery before the laser cutting step is fixed to the laser processing apparatus and is processed by the laser beam. However, the method of processing the all-solid battery in the laser cutting step is not limited thereto. For example, the all-solid battery may be processed by a roll to roll method. In the roll-to-roll processing, an all-solid battery may be processed by a laser beam continuously while rotating a roll, or the roll may be stopped at a constant interval and the all-solid battery may be processed by the laser beam.

As described above, according to the present disclosure, it is possible to provide an all-solid battery with high volume energy density and a method of manufacturing the same.

The all-solid battery according to the present disclosure is expected to be applied to power sources such as portable electronic devices and various types of batteries such as vehicle-mounted batteries.

What is claimed is:

1. An all-solid battery comprising:
   a first current collector;
   a positive-electrode layer that contains a positive-electrode active material;
   a solid electrolyte layer that contains a solid electrolyte;
   a negative-electrode layer that contains a negative-electrode active material;
   a second current collector;
   a positive-electrode fine particle layer; and
   a negative-electrode fine particle layer,
   wherein the first current collector, the positive-electrode layer, the solid electrolyte layer, the negative-electrode layer, and the second current collector are laminated in this order along a laminating direction,
   the positive-electrode fine particle layer contains positive-electrode active material fine particles having a particle diameter smaller than a particle diameter of particles of the positive-electrode active material and is formed in contact with an end portion of the positive-electrode layer, the end portion being at an end of the positive-electrode layer in a direction perpendicular to the laminating direction, and
   the negative-electrode fine particle layer contains negative-electrode active material fine particles having a particle diameter smaller than a particle diameter of particles of the negative-electrode active material and is formed in contact with an end portion of the negative-electrode layer, the end portion being at an end of the negative-electrode layer in a direction perpendicular to the laminating direction.

2. The all-solid battery of claim 1,
   wherein a solid electrolyte fine particle layer including solid electrolyte fine particles having a particle diameter smaller than a particle diameter of particles of the solid electrolyte is formed on an outside of at least one of the positive-electrode fine particle layer and the negative-electrode fine particle layer.

3. The all-solid battery of claim 2,
   wherein the solid electrolyte fine particle layer is formed so as to cover the outside of the positive-electrode fine particle layer.

4. The all-solid battery of claim 2,
wherein the solid electrolyte fine particle layer is formed so as to cover the outside of the positive-electrode fine particle layer and the negative-electrode fine particle layer.

5. The all-solid battery of claim 1,
wherein a length of a plane where the positive-electrode fine particle layer and the positive-electrode layer are in contact with each other in a laminating direction is twice or more the particle diameter of the positive-electrode active material, and a length of a plane where the negative-electrode fine particle layer and the negative-electrode layer are in contact with each other in the laminating direction is twice or more the particle diameter of the negative-electrode active material.

* * * * *